US007908024B2

(12) United States Patent
Chen et al.

(10) Patent No.: US 7,908,024 B2
(45) Date of Patent: Mar. 15, 2011

(54) METHOD AND SYSTEM FOR DETECTING TOOL ERRORS TO STOP A PROCESS RECIPE FOR A SINGLE CHAMBER

(75) Inventors: Chun-Hsiang Chen, Taoyuan County (TW); Yun-Sen Lai, Taoyuan County (TW); Keng-Hsien Ho, Taoyuan County (TW); Chien-Lung Tseng, Taoyuan County (TW); Hung-Chih Kuo, Taoyuan County (TW)

(73) Assignee: Inotera Memories, Inc., Taoyuan (TW)

( * ) Notice: Subject to any disclaimer, the term of this patent is extended or adjusted under 35 U.S.C. 154(b) by 297 days.

(21) Appl. No.: 12/166,245

(22) Filed: Jul. 1, 2008

(65) Prior Publication Data
US 2009/0254208 A1      Oct. 8, 2009

(30) Foreign Application Priority Data

Apr. 8, 2008   (TW) .............................. 97112629 A

(51) Int. Cl.
  *G06F 19/00*   (2006.01)
  *H01L 21/66*   (2006.01)
(52) U.S. Cl. ............ 700/110; 700/80; 700/83; 700/108; 700/121; 438/16

(58) Field of Classification Search .................... 700/80, 700/83, 108, 110, 121; 438/16
See application file for complete search history.

(56) References Cited

U.S. PATENT DOCUMENTS

| | | | | |
|---|---|---|---|---|
| 6,365,425 | B1 * | 4/2002 | Ikota et al. | 438/16 |
| 6,671,570 | B2 * | 12/2003 | Schulze | 700/121 |
| 6,738,731 | B1 * | 5/2004 | Riley et al. | 702/185 |
| 6,826,437 | B2 * | 11/2004 | Hobbs et al. | 700/99 |
| 6,952,656 | B1 * | 10/2005 | Cordova et al. | 702/117 |
| 7,043,384 | B2 * | 5/2006 | Matsushita et al. | 702/81 |
| 7,082,345 | B2 * | 7/2006 | Shanmugasundram et al. | 700/121 |
| 7,123,980 | B2 * | 10/2006 | Funk et al. | 700/121 |
| 7,324,855 | B2 * | 1/2008 | Ushiku et al. | 700/83 |
| 7,534,725 | B2 * | 5/2009 | Shen et al. | 438/692 |
| 7,624,003 | B2 * | 11/2009 | Yamartino | 703/6 |
| 7,636,608 | B2 * | 12/2009 | Funk et al. | 700/108 |
| 7,672,747 | B2 * | 3/2010 | Huang et al. | 700/100 |
| 2002/0116083 | A1 * | 8/2002 | Schulze | 700/108 |

* cited by examiner

*Primary Examiner* — Albert Decady
*Assistant Examiner* — Tom Stevens

(57) ABSTRACT

A method for detecting tool errors to stop a process recipe for a single chamber is disclosed. When a recipe error for one of chamber of a process tool is detected, only the chamber with the recipe error is terminated and other chambers are allowed to proceed with their recipe processes for preventing excursions.

12 Claims, 3 Drawing Sheets

METHOD AND SYSTEM FOR DETECTING TOOL ERRORS TO STOP A PROCESS RECIPE FOR A SINGLE CHAMBER

CROSS REFERENCE TO RELATED APPLICATIONS

This application claims priority of Taiwan Patent Application No. 97112629, filed on Apr. 8, 2008, the entirety of which is incorporated by reference herein.

BACKGROUND OF THE INVENTION

1. Field of the Invention

The invention relates to semiconductor manufacturing, and more particularly to a method and system for detecting tool errors to stop a process recipe for a single chamber.

2. Description of the Related Art

FIG. 1 is a schematic view semiconductor fabrication manufacturing equipment. The manufacturing equipment at least comprises a fault detection and classification system 110, an equipment automation program server 120, and a process tool 130. The process tool 130 at least comprises plural chambers 131, 132, and 133. It is noted that semiconductor fabrication manufacturing equipment comprises other manufacturing equipment or components, which are not described for simplification.

The fault detection and classification system 110 is very important in improving yield rates, using processing control methods and tool sensor outputs to increase tool productivity and reduce manufacturing costs. The equipment automation program server 120 automatically retrieves process parameters from the process tool 130 and sends reports back to the fault detection and classification system 110 to immediately determine processing states of the process tool 130.

When a retrieved wafer lot is processed using a process recipe, the process tool 130 sends a process start message (Process_Start, for example) to the equipment automation program server 120 using the process tool and the equipment automation program server 120 forwards the process start message to the fault detection and classification system 110 and monitors and tracks processing states of the process tool 130. Meanwhile, the process tool 130 transmits process data (relating to the chambers 131, 132, and 133) to the equipment automation program server 120 at time intervals (one second, for example) and the equipment automation program server 120 forwards the process data to the fault detection and classification system 110 to determine whether a process error in the chambers 131, 132, and 133 is generated during performance of the process recipe.

While one of the chambers 131, 132, and 133 of the process tool 130 is performing or completes the process recipe, the fault detection and classification system 110 calculates, according to the received process data, and determines, whether a process result exceeds a preset condition based on the calculated results. If the process result exceeds the preset condition, the fault detection and classification system 110 sends an error message to the equipment automation program server 120. When the error message is received, the equipment automation program server 120 sends a termination message to the process tool 130 to enable the process tool 130 to stop performing the process recipe of the chambers 131, 132, and 133.

Conventionally, control jobs (i.e. running wafer lots with the process recipe) for the process tool 130 are terminated by the equipment automation program server 120 to ensure that wafer lots waiting to be processed are unaffected. Terminating the other chambers, however, when a process error for one of the chambers is generated, may result in decreased yield rates.

Thus, a method and system for detecting tool errors to stop a process recipe for a single chamber is desirable

BRIEF SUMMARY OF THE INVENTION

Systems for detecting tool errors to stop a process recipe for a single chamber are provided. An exemplary embodiment of a system for detecting tool errors to stop a process recipe for a single chamber comprises a process tool, an equipment automation program server, and a fault detection and classification system. The process tool further comprises a first chamber and a second chamber. When the first and second chambers process a wafer lot using a process recipe, the process tool sends a process start message. The equipment automation program server receives the process start message from the process tool and monitors and tracks processing states of the process tool. The fault detection and classification system receives the process start message from the equipment automation program server. When a process error for the first chamber is generated, the process tool transmits the process error to the equipment automation program server. When the process error is retrieved, the equipment automation program server generates a process error command comprising an identification of the first chamber and transmits the process error command to the process tool via the fault detection and classification system and the equipment automation program server. When the process tool receives the process error command, an executing state of the first chamber is changed using an automation program sending a command based on the identification of the first chamber to enable the first chamber to stop performing the process recipe of the first chamber.

Methods for detecting tool errors to stop a process recipe for a single chamber are provided. An exemplary embodiment of a method for detecting tool errors to stop a process recipe for a single chamber comprises the following. When first and second chambers of a process tool processes a wafer lot using a process recipe, a process start message is sent using the process tool. The process start message is transmitted to an equipment automation program server and a fault detection and classification system respectively to enable the equipment automation program server to monitor and track processing states of the process tool. When a process error for the first chamber is generated, the process tool transmits the process error to the equipment automation program server. When the process error is retrieved, the equipment automation program server generates a process error command comprising an identification of the first chamber and transmits the process error command to the process tool via the fault detection and classification system and the equipment automation program server. When the process tool receives the process error command, an executing state of the first chamber is changed using an automation program sending a command based on the identification of the first chamber to enable the first chamber to stop performing the process recipe of the first chamber.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
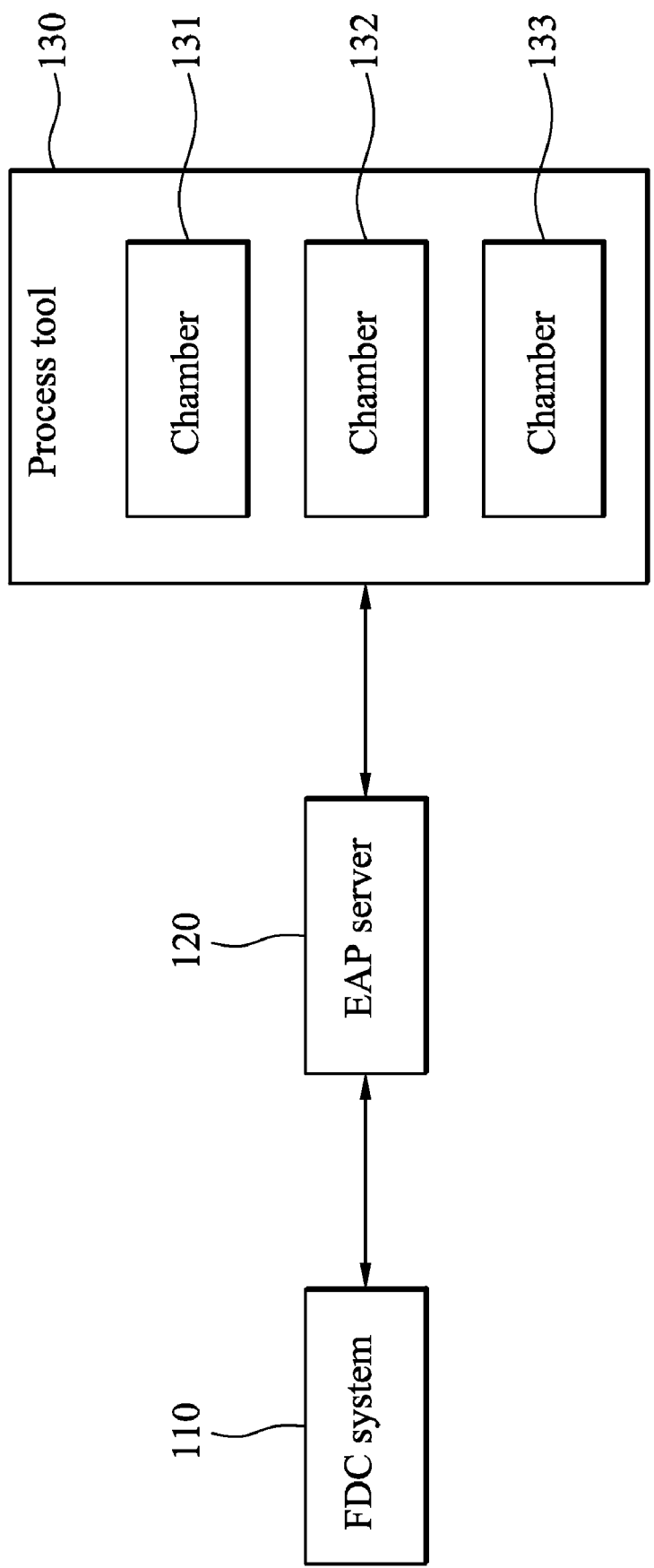
FIG. 1 is a schematic view semiconductor fabrication manufacturing equipment.

Several exemplary embodiments of the invention are described with reference to FIGS. 2 through 3, which generally relate to detecting tool errors to stop a process recipe for a single chamber. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses a method and system for detecting tool errors to stop a process recipe for a single chamber.

In this embodiment, when a process error command (named an iFDC command, generally) is retrieved from a fault detection and classification system, an equipment automation program transmits the process error command to a process tool and changes an executing state of an abnormal chamber of the process tool using a Semiconductor Equipment and Material International (SEMI) Equipment Communication Standard (SECS) command (or named a chamber stop command) to stop performing the process recipe of the abnormal chamber.

Figure 2:
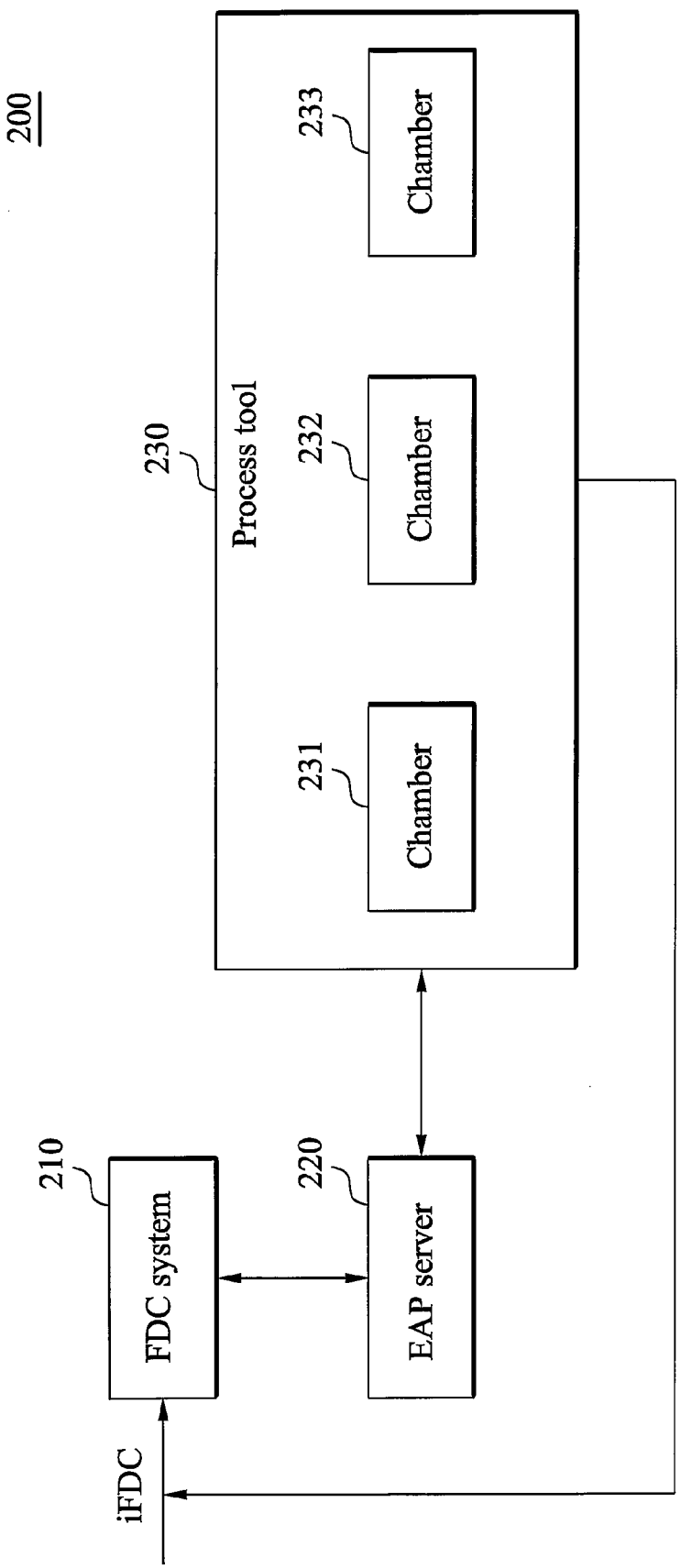
FIG. 2 is a schematic view of a system for detecting tool errors to stop a process recipe for a single chamber of the present invention.

FIG. 2 is a schematic view of a system for detecting tool errors to stop a process recipe for a single chamber of the present invention.

The system 200 comprises a fault detection and classification system 210, an equipment automation program server 220, and a process tool 230. The process tool 230 at least comprises plural chambers 231, 232, and 233.

In an embodiment, the system 200 further comprises an alarm notification service (ANS) server, an advanced encryption standard (AES) server, a manufacturing execution system (MES), a material manager (MM) server, a tool control system (TCS), and other process equipment or components. Because detailed description of the further process equipment or components are well-known to those skilled in the art, they will not be described herein, for simplification. Additionally, the chambers of the process tool 230 are not limited to the chambers 231, 232, and 233 in practice.

The fault detection and classification system 210 improves yield rates using processing control methods and tool sensor outputs to increase tool productivity and reduce manufacturing costs. The equipment automation program server 220 automatically retrieves process parameters from the process tool 230 and reports back to the fault detection and classification system 210 to immediately determine processing states of the process tool 230.

When a retrieved wafer lot is processed using a process recipe by the chambers 231, 232, and 233 of the process tool 230, the process tool 230 sends a process start message (Process_Start, for example) to the equipment automation program server 220 and the equipment automation program server 220 forwards the process start message to the fault detection and classification system 210 and monitors and tracks processing states of the process tool 230. Meanwhile, the process tool 230 transmits process data (relating to the chambers 231, 232, and 233) to the equipment automation program server 220 at time intervals (one second, for example) and the equipment automation program server 220 forwards the process data to the fault detection and classification system 210 to determine whether a process error for the chambers 231, 232, and 233 is generated during performance of the process recipe.

When a process error for one of the chambers (the chamber 231, for example) of the process tool 230 is generated, the process tool 230 transmits the process error to the equipment automation program server 220. When the process error is received, the equipment automation program server 220 enables the system 200 to generate a process error command (named an iFDC command, generally) comprising an identification of the chamber 231 and the process error command is transmitted to the process tool 230 via the fault detection and classification system 210 and the equipment automation program server 220. When the process error command is received, the process tool 230 changes an executing state of the chamber 231 based on the identification using an SECS command to stop performing the process recipe of the chamber 231. When the process error is excluded, the process recipe performed by the chamber 231 is recovered according to a reactivation command, enabling the chamber 231 to re-perform the process recipe thereof.

In this embodiment, it is noted that the process error command is in a field of any process data or process messages, avoiding incompatible for equipment. Additionally, the process error command can also be generated by the equipment automation program server 220 or a MES (not shown).

Figure 3:
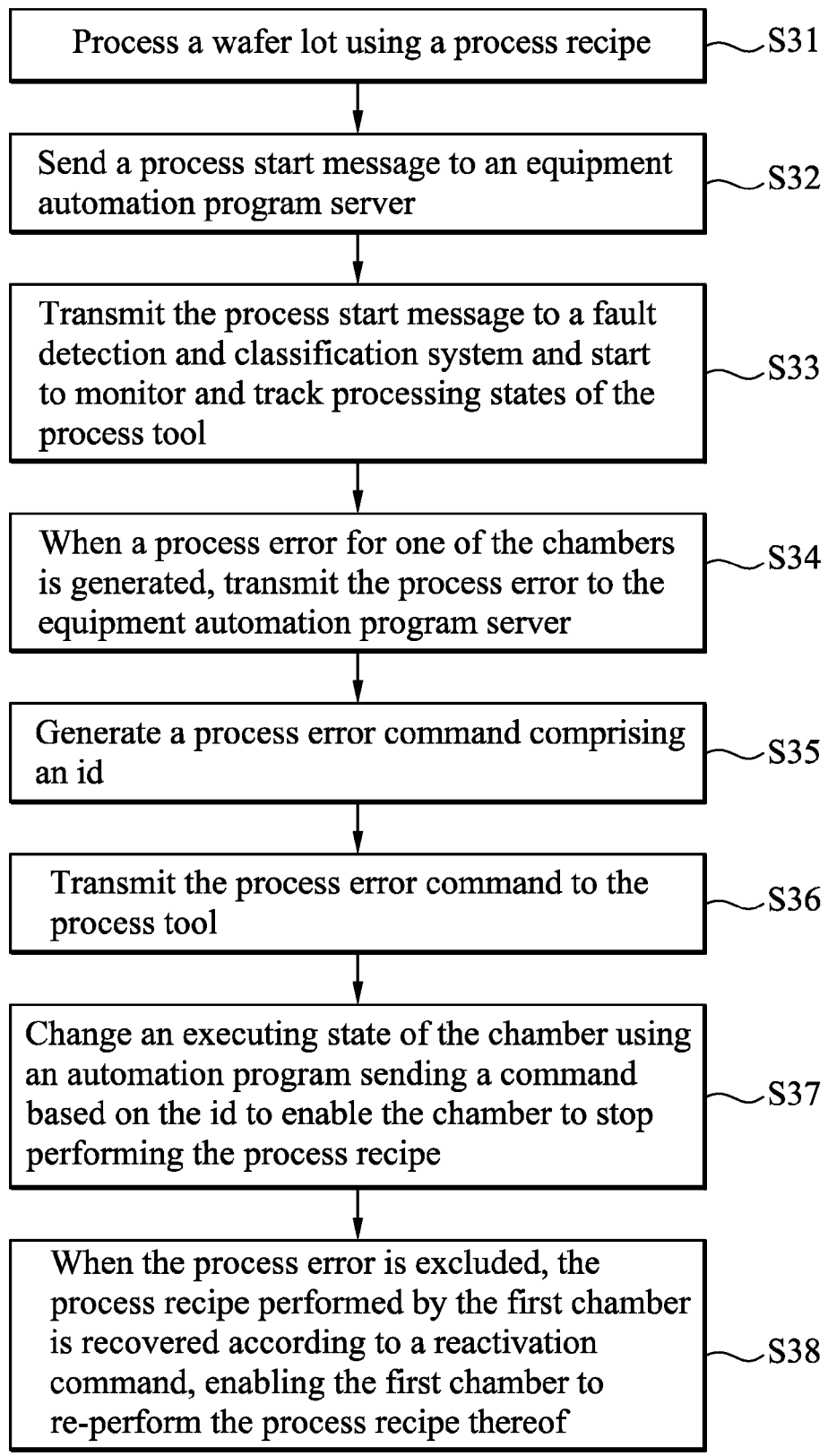
FIG. 3 is a flowchart of a method for detecting tool errors to stop a process recipe for a single chamber of the present invention.

FIG. 3 is a flowchart of a method for detecting tool errors to stop a process recipe for a single chamber of the present invention.

When first, second, and third chambers of a process tool processes a wafer lot using a process recipe (step S31), a process start message (Process_Start, for example) is sent to an equipment automation program server (step S32). The equipment automation program server transmits the process start message to a fault detection and classification system and starts to monitor and track processing states of the process tool (step S33).

When a process error for one of the chambers (the first chamber, for example) is generated, the process tool transmits the process error to the equipment automation program server (step S34). When the process error is retrieved, a process error command (named an iFDC command, generally) comprising an identification of the first chamber is generated (step S35) and is transmitted to the process tool via the fault detection and classification system and the equipment automation program server (step S36). When the process tool receives the process error command, an executing state of the first chamber is changed using an automation program sending a command based on the identification of the first chamber to enable the first chamber to stop performing the process recipe of the first chamber (step S37). When the process error is excluded, the process recipe performed by the first chamber is recovered according to a reactivation command, enabling the first chamber to re-perform the process recipe thereof (step S38).

An embodiment of the method and system for detecting tool errors to stop a process recipe for a single chamber can stop performing a process recipe of one chamber of a process tool when a process error for the chamber has been detected while continuing performance of the process recipe for the other chambers to prevent decrease in yield rates.

Methods and systems of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for detecting tool errors to stop a process recipe for a single chamber, comprising:
    a process tool, further comprising a first chamber and a second chamber, wherein when the first and second chambers process a wafer lot using a process recipe, a process start message is sent;
    an equipment automation program server, receiving the process start message from the process tool and monitoring and tracking processing states of the process tool; and
    a fault detection and classification system, receiving the process start message from the equipment automation program server,
    wherein, when a process error for the first chamber is generated, the process tool transmits the process error to the equipment automation program server;
    when the process error is retrieved, the equipment automation program server generates an iFDC error command comprising an identification of the first chamber and transmits the iFDC error command to the process tool via the fault detection and classification system and the equipment automation program server; and
    when the process tool receives the iFDC error command, changing an executing state of the first chamber using an automation program sending a command based on the identification of the first chamber to enable the first chamber to stop performing the process recipe of the first chamber.

2. The system for detecting tool errors to stop a process recipe for a single chamber as claimed in claim 1, wherein the second chamber proceeds with the process recipe thereof when the first chamber stops performing the process recipe thereof.

3. The system for detecting tool errors to stop a process recipe for a single chamber as claimed in claim 1, wherein the process recipe performed by the first chamber is recovered according to a reactivation command and when the process error is excluded, the first chamber is enabled to re-perform the process recipe thereof.

4. The system for detecting tool errors to stop a process recipe for a single chamber as claimed in claim 1, wherein the iFDC error command is in a field of any process data or a process message.

5. A method for detecting tool errors to stop a process recipe for a single chamber, comprising:
    when first and second chambers of a process tool processes a wafer lot using a process recipe, a process start message is sent using the process tool;
    transmitting the process start message to an equipment automation program server and a fault detection and classification system respectively to enable the equipment automation program server to monitor and track processing states of the process tool;
    when a process error for the first chamber is generated, the process tool transmitting the process error to the equipment automation program server;
    when the process error is retrieved, the equipment automation program server generating an iFDC error command comprising an identification of the first chamber and transmitting the iFDC error command to the process tool via the fault detection and classification system and the equipment automation program server; and
    when the process tool receives the iFDC error command, changing an executing state of the first chamber using an automation program sending a command based on the identification of the first chamber to enable the first chamber to stop performing the process recipe of the first chamber.

6. The method for detecting tool errors to stop a process recipe for a single chamber as claimed in claim 5, wherein the second chamber proceeds with the process recipe thereof when the first chamber stops performing the process recipe thereof.

7. The method for detecting tool errors to stop a process recipe for a single chamber as claimed in claim 5, wherein the process recipe performed by the first chamber is recovered according to a reactivation command, and when the process error is excluded, the first chamber is enabled to re-perform the process recipe thereof.

8. The method for detecting tool errors to stop a process recipe for a single chamber as claimed in claim 1, wherein the iFDC error command is in a field of any process data or a process message.

9. A computer-readable storage medium storing a computer program providing a method for detecting tool errors to stop a process recipe for a single chamber, comprising using a computer to perform the steps of:
    when first and second chambers of a process tool processes a wafer lot using a process recipe, a process start message is sent using the process tool;
    transmitting the process start message to an equipment automation program server and a fault detection and classification system respectively to enable the equipment automation program server to monitor and track processing states of the process tool;
    when a process error for the first chamber is generated, the process tool transmits the process error to the equipment automation program server;
    when the process error is retrieved, the equipment automation program server generates an iFDC error command comprising an identification of the first chamber and transmits the iFDC error command to the process tool via the fault detection and classification system and the equipment automation program server; and when the process tool receives the iFDC error command, changing an executing state of the first chamber using an automation program sending a command based on the identification of the first chamber to enable the first chamber to stop performing the process recipe of the first chamber.

10. The computer-readable storage medium as claimed in claim 9, wherein the second chamber proceeds with the process recipe thereof when the first chamber stops performing the process recipe thereof.

11. The computer-readable storage medium as claimed in claim 9, wherein the process recipe performed by the first chamber is recovered according to a reactivation command, and when the process error is excluded, the first chamber is enabled to re-perform the process recipe thereof.

12. The computer-readable storage medium as claimed in claim 9, wherein the iFDC error command is in a field of any process data or process messages.

* * * * *